United States Patent [19]

Kaise

[11] Patent Number: 5,740,049
[45] Date of Patent: Apr. 14, 1998

[54] RECKONING SYSTEM USING SELF RECKONING COMBINED WITH RADIO RECKONING

[75] Inventor: Yasutoshi Kaise, Zama, Japan

[73] Assignee: Xanavi Informatics Corporation, Zama, Japan

[21] Appl. No.: 566,632

[22] Filed: Dec. 4, 1995

[30] Foreign Application Priority Data

Dec. 5, 1994 [JP] Japan .................... 6-300930

[51] Int. Cl.⁶ .................... G06F 165/00; G01C 21/12
[52] U.S. Cl. .................. 364/450; 364/449.2; 364/449.7; 364/449.95; 342/357; 342/457; 340/990
[58] Field of Search .............. 364/449.1, 449.2, 364/449.7, 449.95, 450, 453; 340/990, 988, 995; 342/457, 357

[56] References Cited

U.S. PATENT DOCUMENTS

| | | | |
|---|---|---|---|
| 4,459,667 | 7/1984 | Takeuchi | 364/449.1 |
| 4,899,285 | 2/1990 | Nakayama et al. | 364/453 |
| 4,903,212 | 2/1990 | Yokouchi et al. | 364/449.95 |
| 4,949,268 | 8/1990 | Nishikawa et al. | 364/449.95 |
| 5,220,509 | 6/1993 | Takemura et al. | 364/449.95 |
| 5,257,195 | 10/1993 | Hirata | 364/449.95 |
| 5,272,483 | 12/1993 | Kato | 342/357 |
| 5,293,318 | 3/1994 | Fukushi-Ma | 340/990 |
| 5,374,933 | 12/1994 | Kao | 342/357 |
| 5,469,158 | 11/1995 | Morita | 340/988 |
| 5,539,647 | 7/1996 | Shibata et al. | 364/454 |

FOREIGN PATENT DOCUMENTS

| | | |
|---|---|---|
| 0 527 558 A1 | 2/1993 | European Pat. Off. . |
| 59-148803 | 8/1984 | Japan . |

OTHER PUBLICATIONS

EPO Patent Abstract for JP6331368 (published Feb., 12, 1994).

EPO European Search Report for Application No. EP 95 11 9029.

*Primary Examiner*—Tan Q. Nguyen
*Attorney, Agent, or Firm*—Pennie & Edmonds LLP

[57] ABSTRACT

A reckoning system capable of determining a current location with reliability higher than a desired level by employing both the radio reckoning and the self reckoning which compensate for each other. Vehicle-speed sensor and gyroscope provide a first provisional current location of a vehicle. A second provisional current location is provided by correcting the first provisional current location in comparison with road map information stored in a CD-ROM. A third provisional current location is obtained on the basis of information from a GPS receiver. If the second and third provisional current locations are close with each other within a predetermined distance, then the second provisional current location is selected as a conclusive current location. If not, speed and heading of the vehicle derived from the GPS receiver are compared with those derived from the vehicle-speed sensor and the gyroscope, respectively. If both matching degrees in speed and heading are high, then the third provisional current location is used to determine the conclusive current location. If at least one of the matching degrees is low, which means that the reliability of radio reckoning is degraded, then the second provisional current location is used to determine the conclusive current location.

12 Claims, 6 Drawing Sheets

F I G . 6
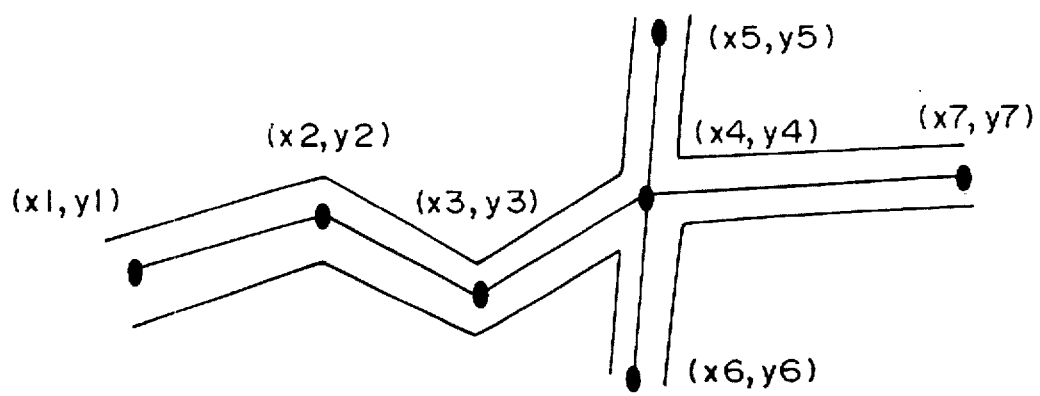

RECKONING SYSTEM USING SELF RECKONING COMBINED WITH RADIO RECKONING

BACKGROUND OF THE INVENTION

1. Field of the Invention

The present invention relates to a reckoning system, and particularly to a location measurement technique for the reckoning system used in a vehicle such as an automobile.

2. Related Art

Known prior-art techniques relating to a reckoning system involve two techniques, i.e., self reckoning (or corrected dead reckoning) and radio reckoning.

The self reckoning for automobiles determines the current location of an automobile by matching, with road map information, an assumed or calculated current location usually obtained based on measurement outputs of a heading sensor, such as a geomagnetism sensor or a gyroscope, and a vehicle-speed sensor.

However, the self reckoning sometimes incorrectly determines a current location in cases where sensor errors accumulate or the road map information is not accurate. Also, the radio reckoning fails to correctly determine the current location in the neighborhood of structure which reflects radio waves.

A known solution to this is a combined use of the self reckoning and the radio reckoning. For example, Japanese patent publication (KOKOKU) No. HEI 5-7643 discloses a technique wherein a possible range, in which the current location is considered to be present, is obtained taking into consideration error ranges of the individual sensors used for the self reckoning, and wherein a current location derived from the radio reckoning is selected as a conclusive current location when the current location derived from the radio reckoning falls within the possible range, and, otherwise, a position in the possible range and nearest the "radio" current location is selected as the conclusive current location.

Incidentally, the self reckoning has a possibility of accurately determining the current location, while, at the same time, also having a possibility of producing a large error in the determined current location, as suggested above. The technique shown in Japanese patent publication No. HEI 5-7643 uses the current location derived from the self reckoning as a reference for defining the above-mentioned possible range. This causes a problem that when the self reckoning produces a large error in the calculated current position, the subsequent current position will be erroneously limited within an area defined by the "self reckoning" current position and the error ranges of the sensors, requiring time to recover to a correct current location, during which the reliability of the current location is remarkably degraded.

The measurement in the radio reckoning is performed such that radio waves are received from artificial satellites, establishing timed relations between their transmissions and receptions on the basis of their phases, modulated data (including transmission time data) and reception time data derived from a clock in a receiver, thereby obtaining the position, speed and heading (or direction) of the receiver by measurement of distances from the satellites and the Doppler measurements. Therefore, the radio reckoning has a characteristic that a large error in the current location will not be produced as long as the measurements are performed with direct waves from the satellites. However, the position, speed and heading all could greatly be erroneous when receiving and using, for measurements, radio waves with their phases shifted, for example because of reflections of the waves at structures or the like, rather than direct waves.

SUMMARY OF THE INVENTION

It is therefore an object to provide a reckoning system capable of determining a current location with reliability of the radio reckoning kept at a level higher than a desired level by considering both characteristics of the radio reckoning and the self reckoning such that the degradation of accuracy of the radio reckoning is monitored through comparison of radio reckoning information with self reckoning information so as to avoid the use of greatly erroneous current location information under conditions of radio disturbances.

According to the present invention, there is provided a reckoning system which is mounted on a vehicle travelling on a road and detects a current location of the vehicle, the reckoning system comprising a heading measurement device for measuring a heading of the vehicle; a distance measurement device for measuring a distance the vehicle has travelled; a speed measurement device for measuring a first speed of the vehicle; a storage device for storing road map information; a self-reckoning device for determining a first provisional current location, based on a last-determined current location of the vehicle and measurement results of the heading measurement device and the speed measurement device; a map matching device for matching at least the first provisional current location with map information of an area around the first provisional current location, stored in said storage device, so as to find a second provisional current location which resides at a road and matches best with the first provisional current location; a radio reckoning device for determining a current location of the vehicle as a third provisional current location, based on radio waves received from a plurality of artificial satellites, and for measuring a second speed of the vehicle; a speed comparator for comparing the first speed measured by the speed measurement device with the second speed measured by the radio reckoning device to provide a matching degree in speed; and a current location determination device for determining a conclusive current location such that the conclusive current location is determined based on the second provisional current location when the matching degree in speed obtained by the speed comparator is lower than a predetermined level, and based on the third provisional current location when the matching degree in speed is equal to or higher than the predetermined level.

The radio reckoning device may also measure a heading of the vehicle in place of or in addition to the speed thereof and the current location determination device may use a matching degree in heading derived from the two headings to determine the conclusive current location.

A reckoning system according to the present invention evaluates, when determining a conclusive current location, at least one of the matching degrees in speed and heading obtained from the speed comparator and the heading comparator. This is to detect irregularity or disorder in measurement of the radio reckoning.

If at least one of the matching degrees in speed and heading is lower than a predetermined level, a decision is made that the reliability of the radio reckoning is unacceptably low, and the conclusive current location is determined based on the second provisional current location, i.e., the current location derived from the self reckoning. Otherwise, it is decided that the radio reckoning is correctly functioning, thereby determining the conclusive current location on the basis of the third provisional current location, i.e., the current location derived from the radio reckoning.

In an embodiment described below, however, the distance between the second and third provisional locations is first calculated, and if this distance is less than a predetermined value, then the conclusive current location is determined based on the second provisional current location irrespective of the matching degrees given by the comparators.

In any case, the present invention is to detect a condition in which the reliability of the radio reckoning is considered to be unacceptably low, so that, in such a case, the use of the third provisional current location derived from the radio reckoning may be avoided.

According to the present invention, the radio reckoning and self reckoning compensate for each other so as to make it possible to determine the current position always with reliability of a predetermined level or higher.

BRIEF DESCRIPTION OF THE DRAWINGS

FIG. 6 shows a form of representation of roads, used in road map information.

DETAILED DESCRIPTION OF THE PREFERRED EMBODIMENT

Now, referring to the attached drawings, a preferred embodiment of a reckoning system according to the present invention will be described below.

Figure 1:
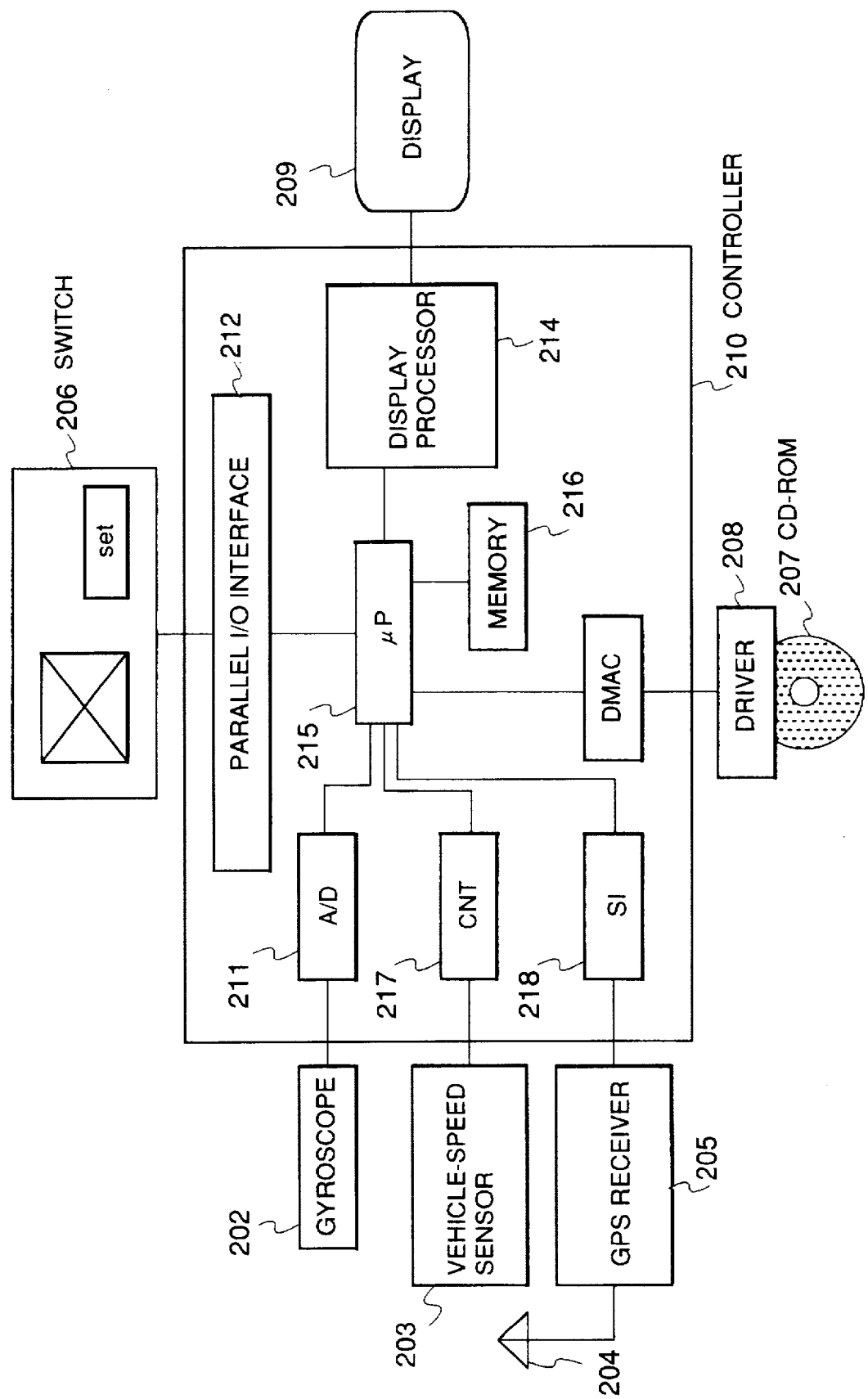
FIG. 1 is a block diagram showing an embodiment of a reckoning system according to the present invention.

Referring first to FIG. 1, there is shown a construction of the reckoning system of the present embodiment. Numeral 202 indicates an angular velocity sensor such as a gyroscopic device, or a geomagnetic angular sensor such as a geomagnetism sensor. The angular velocity sensor 202 comprises an optical-fiber gyroscope in the present embodiment. The optical-fiber gyroscope 202 is arranged so as to detect the yaw rate of a vehicle. Numeral 203 indicates a vehicle speed sensor which produces pulses, the rate of which is proportional to the rotation of the transmission. Numeral 204 indicates an antenna which receives radio waves transmitted from GPS (global positioning system) satellites. Numeral 205 indicates a GPS receiver which processes signals received at the antenna 204 to produce a position, heading and speed of the vehicle.

Numeral 206 indicates a switch (e.g., a push-button switch) by which a user (or driver) commands a switching in scale of a map displayed on the screen of a display. Numeral 207 indicates a CD-ROM which stores digitized road map information. Numeral 208 indicates a driver for reading out the road map information stored in the CD-ROM 207.

Further, numeral 210 indicates a controller which serves to determine a current location of a vehicle on the basis of output values from the optical-fiber gyroscope 202 and the vehicle-speed sensor 203, as well as the map information read out of the CD-ROM 207 via the driver 208. Numeral 209 indicates a display device which displays, as shown in FIG. 2, a map of an area around the current location determined by the reckoning system, together with a mark or the like representing the current location, under control by the controller 210.

In the controller 210, numeral 211 indicates an analog to digital (A/D) converter which converts an analog signal from the gyroscope into a corresponding digital signal. Numeral 217 indicates a counter (CNT) which counts pulses generated from the vehicle-speed sensor for every t seconds (for example, t=0.5). Numeral 218 indicates a serial interface (SI) which accepts data from the GPS receiver 205. Numeral 212 indicates a parallel I/O (input/output) interface for recognizing a pushed state of the switch 206. Numerals 215 and 216 indicate a microprocessor and a memory, respectively. Numeral 213 indicates a direct-memory-access controller (DMAC) which serves to transfer read-out map data to the memory 216. Numeral 214 indicates a display processor which controls the display on the display device 209.

Figure 2:
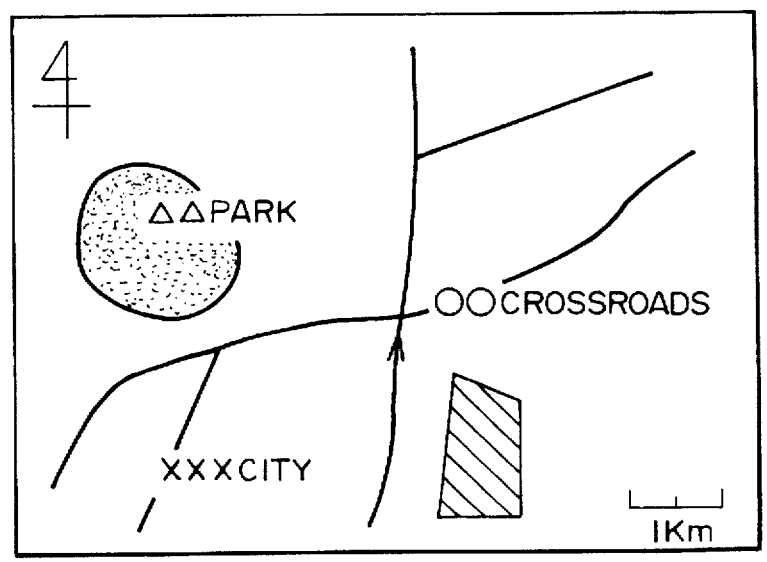
FIG. 2 shows an example of display in the embodiment of FIG. 1.

With this arrangement of the reckoning system, the microprocessor 215 processes input signals derived from the A/D converter 211, the parallel I/O interface 212, the DMA controller 213, the counter 217 and the serial interface 218 so as to issue commands which cause the display processor 214 to realize such display as shown in FIG. 2.

The memory 216 includes a read-only memory (ROM) which stores programs to perform the processings as stated below, and a random access memory or read-write memory (RAM) which is used as a work area for the processings of the microprocessor 215.

Now, an explanation will be given of the processing of determining a current location, employed in the reckoning system of the present embodiment. In the present embodiment, the microprocessor 215 performs the following three processings: a processing for calculating heading, distance and speed, a processing for determining a current location, and a processing of display.

First, the processing of calculating heading, distance and speed will be explained. This processing is activated at regular intervals, or every t seconds (e.g., t=0.5) according to timer interruptions by means of a timer in the microprocessor 215.

Figure 3:
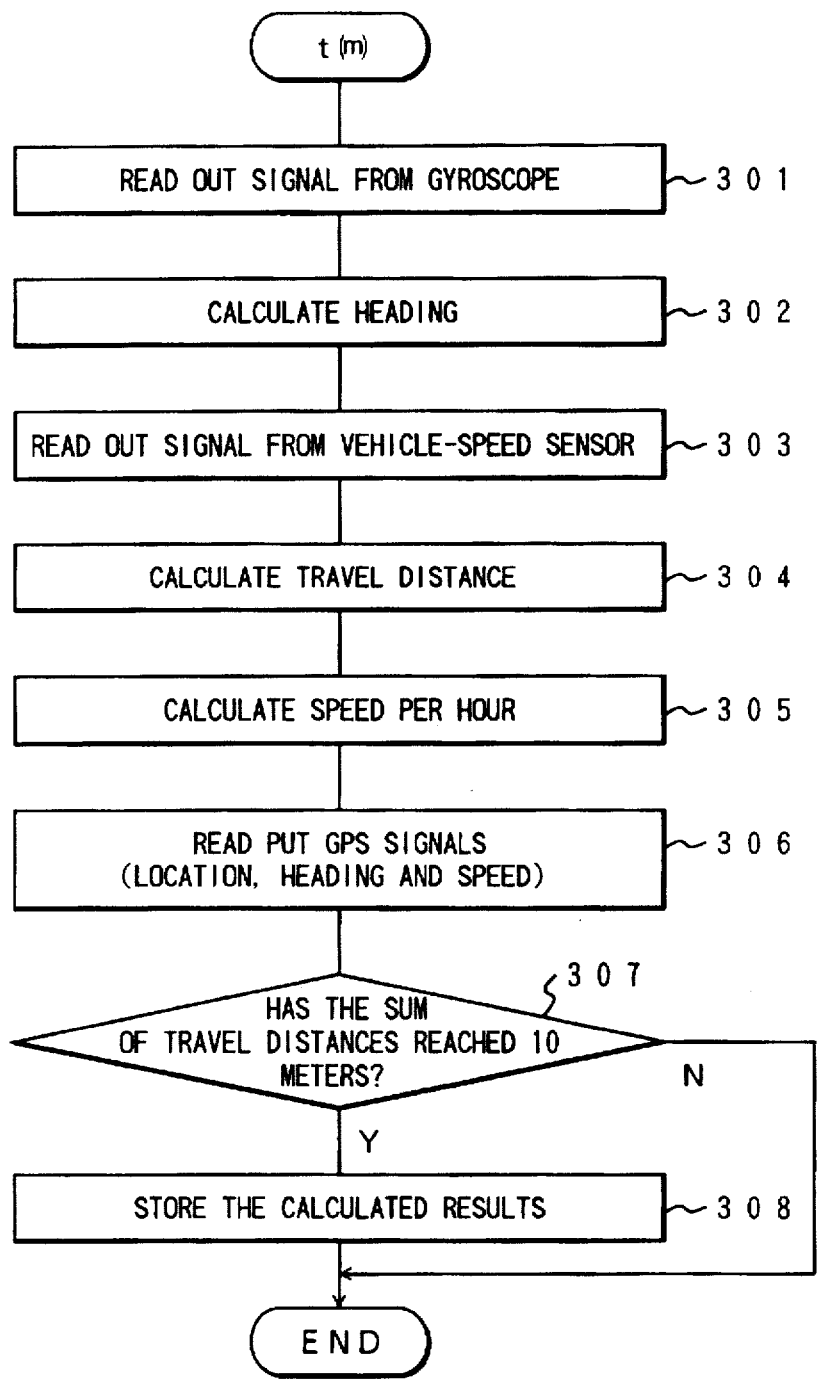
FIG. 3 is a flowchart which shows the sequence of steps for calculating heading, distance and speed in the embodiment of FIG. 1.

Referring to FIG. 3, there is shown a sequence of steps of the processing of calculating heading, distance and speed. As shown in FIG. 3, this processing first reads an output value of the optical-fiber gyroscope 202 via the A/D converter 211 (step 301), where the output value of the optical-fiber gyroscope 202 represents a variation in heading. The output from the optical-fiber scope 211 is added with the last-determined heading to provide a newly-determined heading (step 302).

Next, the number of pulses generated by the vehicle-speed sensor for the last t seconds is read out of the counter 217 (step 303). This count value is multiplied by a travel distance coefficient which defines a travel distance per rotation of a tire, thus producing the travel distance the vehicle has travelled for t seconds (step 304). Then, the resultant value of the travel distance is multiplied by 3600/t, producing a speed per hour (S1) (step 305).

Finally, a position, heading and speed calculated in the GPS receiver 205 are read out via the serial interface 218 (step 306). The travel distance calculated in step 304 is accumulated and it is checked whether the accumulated distance (or sum) reaches a predetermined value L (e.g., 10 meters) (step 307). If the accumulated distance reaches the predetermined value L, then the memory 216 receives to store therein the heading (calculated at step 302), speed (calculated at step 305), distance (L) as well as the position, heading and speed (calculated at step 306) derived from the GPS signals at that time (step 308). In addition, the accumulated distance L is reset to zero.

Figure 4:
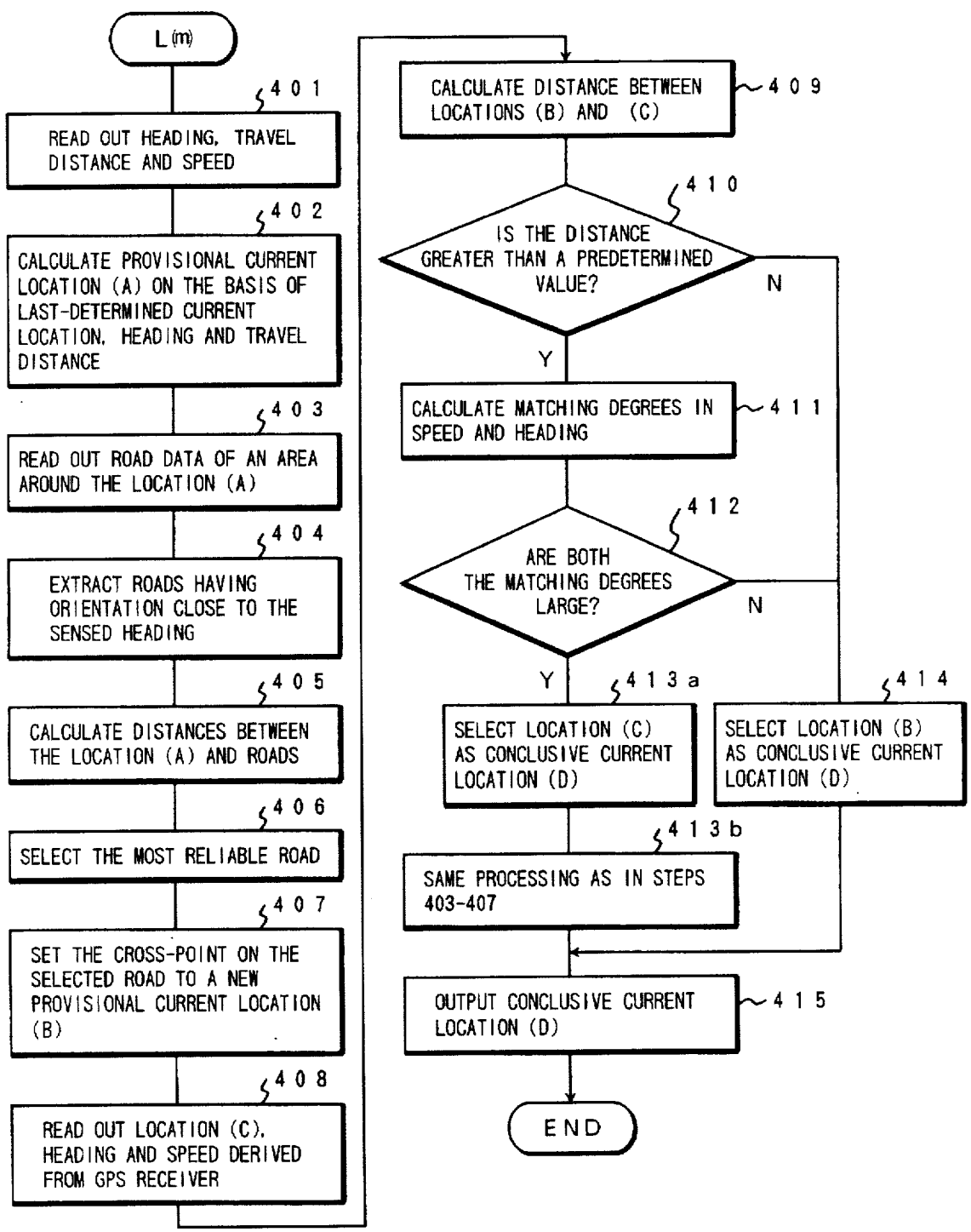
FIG. 4 is a flowchart which shows the sequence of steps for determining a (conclusive) current location in the embodiment of FIG. 1.

Referring next to FIG. 4, the processing of determining a current location will be explained. This processing is activated each time the processing of calculating heading, distance and speed is terminated, that is, each time a vehicle travels L meters.

As shown in FIG. 4, first in this processing, the heading and distance obtained in the above-described processing are read out of the memory 216 (step 401). From this information, travel distances resolved in longitude and latitude are calculated and added with the respective last-determined current location data to determine a provisional current location (A) (step 402). Incidentally, if no last-determined data is available in the initial processing, then the current location last determined by the GPS receiver is used instead.

Next, the provisional current location (A) is corrected through matching with a corresponding road map. A specific processing to this will be described in the following steps 404–407. Map data of an area around the provisional current location (A) is read out via the driver 208 from the CD-ROM 207 and then segments of roads are extracted which falls within a searching range which is defined as a circle of a predetermined radius with its center point located at the provisional current location (A) (step 403). Each road is represented by links or line segments connected in series. For example, as shown in FIG. 6, a road in the road map information is represented in the form of coordinates of end points (or nodes) of the line segments along the road.

Then, only the links whose orientations fall within a desired angular range relative to the heading are extracted (step 404). A line perpendicular to each extracted link is extended from the point of the provisional current location (A) toward that link, and the length of the line from that point to the cross point of the link and the line (i.e., the distance between the provisional current location (A) and the link) is obtained (step 405). A reliability factor (Rf) of a given link is calculated by the formula:

$$Rf = 1/(\alpha |(H-Lo)| + \beta |M|)$$

where "H" indicates a value of the heading, Lo indicates a value of the link orientation, "M" indicates the length of the line obtained above, and "| |" indicates an operator to produce an absolute value. Also, "$\alpha$" and "$\beta$" indicate positive weight factors where $\alpha + \beta = 1$. When taking the road, having orientation near the heading, more serious, the value "$\alpha$" is made greater than that of "$\beta$". Conversely, when taking the road nearer from the provisional current location (A), more serious, the value "$\beta$" is made greater. The link having the greatest value of the reliability factor is selected (step 406), and the above-mentioned cross point of that link is set to a corrected provisional current location (B) (step 407).

The processing in steps 403–407 is an example of the map matching process which corrects the provisional current location (A) in light of map data.

The microprocessor 215 then reads, out of the memory 216, the position, heading and speed (S2) which were previously derived from the GPS and stored in the memory 216 (step 408). This position due to the GPS is used later as a provisional current location (C).

As stated above, the self reckoning has a possibility of determining the current location more exactly than the radio reckoning, while also having a possibility of producing a large accumulated error. In contrast, the radio reckoning could produce a minor error but does not produce a large error unless the GPS is correctly functioning, because its position computation is performed in an absolute manner. For this reason, the distance between the provisional current locations (B) and (C) is calculated (step 409) and then the thus calculated distance is compared with a predetermined value (step 410). If the distance is smaller than the predetermined value, then the provisional current location (B) is selected as a conclusive current location (D) even if the GPS is correctly functioning, because the location (B) is likely to be an exact current location (step 414).

If the distance obtained in step 409 is greater than the predetermined value, then a check is made as to the matching degree between the speed derived from the GPS (referred to as a GPS speed) and that derived from the vehicle-speed sensor (referred to as a pulse speed) (step 411). In this check of the matching degree, it is decided that the matching degree is small (i.e., lower than a predetermined level) when the following inequality is satisfied, and, otherwise, the matching degree is large (i.e., higher than the predetermined level).

$$\gamma / S1 < |S2 - S1|/S1$$

where the right term of the inequality represents an error rate of the GPS speed (S2) with respect to the pulse speed (S1). The left term represents an upper limit of the error rate and is in inverse proportion to the pulse speed (S1), because the error rate of the GPS speed (S2) tends to be larger as the speed lowers. The constant "$\gamma$" indicates a positive weight coefficient for that purpose.

In cases where phase shift in GPS waves occurs due to reflection or the like, the radio reckoning may produce a large error. This is a reason why such an irregular state is detected by checking the matching degree of the pulse speed (S1) and the GPS speed (S2). As will be explained below, the self reckoning is employed when the GPS malfunctions, whereas the radio reckoning is employed when the GPS is in a normal state. Thus, the use of the GPS in an irregular state can be avoided.

Similarly, a check is made as to the matching degree between the heading (D2) derived from the GPS (referred to as a GPS heading) and the heading (D1) derived from the optical-fiber gyroscope (referred to as a gyro heading) (step 411). In this check of the matching degree, it is decided that the matching degree in heading is small when the following inequality is satisfied, and, otherwise, the matching degree is large.

$$\eta / S1 < |D2 - D1|/D1$$

where the right term of the inequality represents an error rate of the GPS heading (D2) with respect to the gyro heading (D1). The left term represents an upper limit of the error rate and is in inverse proportion to the pulse speed (S1), because the error rate of the GPS heading (D2) tends to be larger as the speed becomes lower, as stated above. The constant "$\eta$" indicates a positive weight coefficient for that purpose.

Thus, the irregularity of the GPS is detected to a certain extent by checking the matching degree in heading as in the checking of that in speed. The present embodiment checks both the matching degrees in order to more certainly detect the irregularity of the GPS (step 411). If either one of the two matching degrees is low (step 412) which means that the GPS is in an irregular state, then the GPS use is avoided and the provisional current location (B) is employed as the conclusive current location (D) (step 414). Although the two types of matching degrees, in speed and heading, are employed in the present embodiment, only one of them will be sufficient.

Only when the distance obtained in step 409 is greater than the predetermined value and the GPS is normal, the provisional current location C) derived from the GPS is selected (413a). This selected current location is then subject to the map matching processing as in steps 403–407 to determine the conclusive current location (D) (step 413b). Finally, the conclusive current location (D) is output or stored in the memory 216 (step 415).

Figure 5:
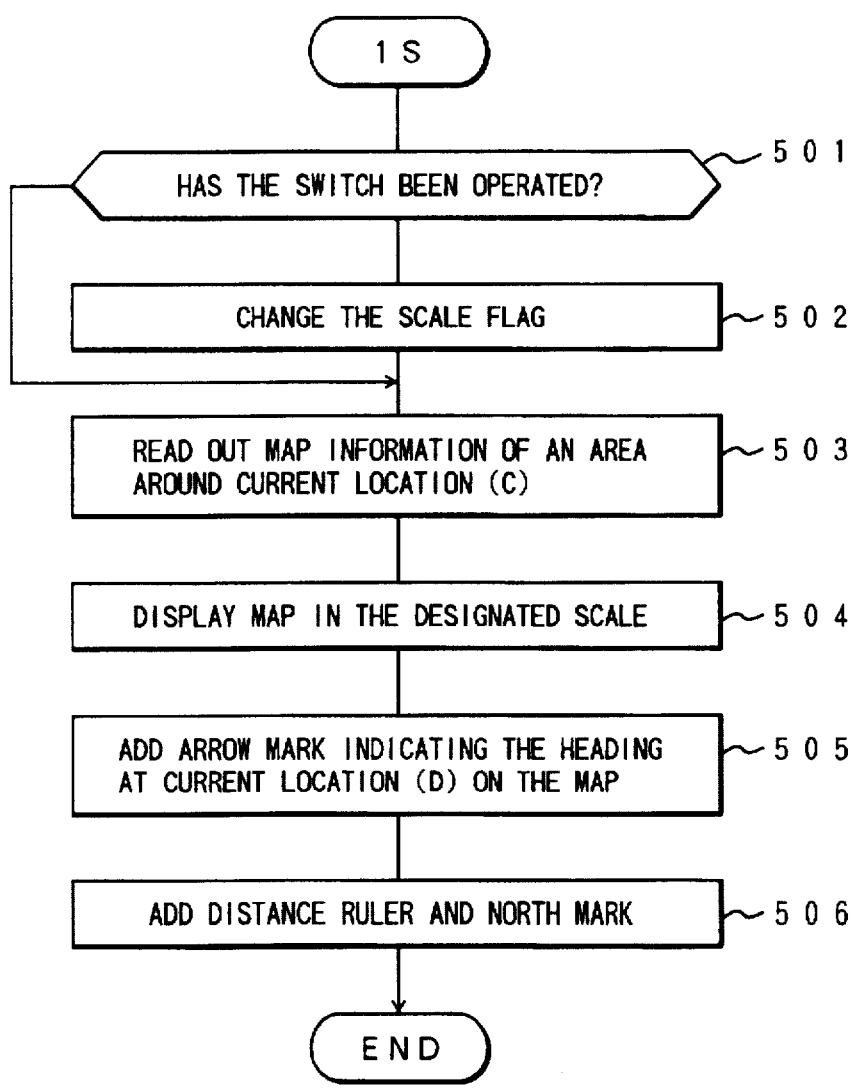
FIG. 5 is a flowchart which shows the sequence of steps for display processing.

Referring next to FIG. 5, there are shown steps of the display processing. In this processing, as shown in FIG. 2, the conclusive current location (D) determined in the current location determination processing is displayed along with the corresponding map on the display device 209. This processing of FIG. 5 is periodically activated, for example, at regular intervals of one second.

First, the state of the switch 206 is examined based on the data from the parallel I/O interface 212 (step 501). If the switch 206 is in a state commanding a switching of the scaling of display, a scale flag (not shown) is changed in response to the command (step 502). Then, the conclusive current location (D) is read out of the memory 216 (step 503), and also map information of an area corresponding to the conclusive current location (D) is read out of the CD-ROM 207 via the driver 208. The microprocessor 215 drives the display processor 214 to display on the display device 209 that area of map including the conclusive current location (D), the scale of which is controlled depending on the content of the scale flag (step 504). Then, the display processor 214 is commanded to add an arrow mark indicating the heading of the vehicle as shown in FIG. 2, at the position on the map corresponding to the conclusive current location (D) (step 505). Further, the display processor 214 is commanded to additionally display the distance ruler (see the lower right corner of FIG. 2) and the north mark (see the upper left corner of FIG. 2) (step 506).

According to the present invention, there is provided a reckoning system capable of determining a current location with reliability higher than a desired level by employing both the radio reckoning and the self reckoning which compensate for each other.

What is claimed is:

1. A reckoning system for mounting on a vehicle travelling on a road and for detecting a current location of the vehicle, the reckoning system comprising:

a heading measurement means for measuring a heading of the vehicle;

a distance measurement means for measuring a distance the vehicle has travelled;

a speed measurement means for measuring a first speed of the vehicle;

a storage means for storing road map information;

a self-reckoning means for determining a first provisional current location on the basis of a last-determined current location of the vehicle and measurement results of the heading measurement means and the speed measurement means;

a map matching means for matching at least the first provisional current location with map information of an area around the first provisional current location, stored in said storage means, so as to find a second provisional current location which resides at a road and matches best with the first provisional current location;

a radio reckoning means for determining a current location of the vehicle as a third provisional current location, based on radio waves received from a plurality of artificial satellites, and for measuring a second speed of the vehicle;

a speed comparator means for comparing the first speed measured by said speed measurement means with the second speed measured by said radio reckoning means to provide a matching degree in speed; and a current location determination means for determining a conclusive current location such that the conclusive current location is determined based on the second provisional current location when the matching degree in speed obtained by said speed comparator means is lower than a predetermined level, and based on the third provisional current location when said matching degree in speed is equal to or higher than the predetermined level, wherein said speed comparator means decides that the matching degree is lower than the predetermined level when the following inequality is satisfied, and, otherwise, the matching degree is higher than the predetermined level $$\gamma S1 < |S2 - S1|/S1$$

where "S1" and "S2" indicate said first and second speeds, respectively, and "γ" indicates a positive weight coefficient.

2. A reckoning system according to claim 1, wherein said current location determination means calculates a distance between the second and third provisional current locations and selects, when the distance calculated is less than a predetermined value, the second provisional current location as the conclusive current location irrespective of the matching degree given by said speed comparator means.

3. A reckoning system according to claim 1, wherein said radio reckoning means comprises a GPS (Global Positioning System) receiver which produces the third provisional current location on the basis of radio waves transmitted from a plurality of satellites.

4. A reckoning system according to claim 1, wherein said map matching means uses, in addition to the first provisional current location, the heading measured by said heading measurement means to select roads having orientation close to said heading, to be matched with the first provisional current location.

5. A reckoning system for mounting on a vehicle travelling on a road and for detecting a current location of the vehicle, the reckoning system comprising:

a heading measurement means for measuring a first heading of the vehicle;

a distance measurement means for measuring a distance the vehicle has travelled;

a speed measurement means for measuring a speed of the vehicle;

a storage means for storing road map information;

a self-reckoning means for determining a first provisional current location on the basis of a last-determined current location of the vehicle and measurement results of the heading measurement means and the speed measurement means;

a map matching means for matching at least the first provisional current location with map information of an area around the first provisional current location, stored in said storage means, so as to find a second provisional current location which resides at a road and matches best with the first provisional current location;

a radio reckoning means for determining a current location of the vehicle as a third provisional current location, based on radio waves received from a plurality of artificial satellites, and for measuring a second heading of the vehicle;

a heading comparator means for comparing the first heading measured by said heading measurement means with the second heading measured by said radio reckoning means to provide a matching degree in heading; and a current location determination means for determining a conclusive current location such that the conclusive current location is determined based on the second provisional current location when the matching degree in heading obtained by said heading comparator means is lower than a predetermined level, and based on the third provisional current location when said matching degree in heading obtained by said heading comparator means is equal to or higher than the predetermined level, wherein said heading comparator means decides that the matching degree is lower than the predetermined level when the following inequality is satisfied, and, otherwise, the matching degree is higher than the predetermined level $$\eta/S1 < |D2-D1|/D1$$

where "S1" indicates said first speed, "D1" and "D2" indicate said first and second headings, respectively, and "$\eta$" indicates a positive weight coefficient.

6. A reckoning system according to claim 5, wherein said current location determination means calculates a distance between the second and third provisional current locations and selects, when the distance calculated is less than a predetermined value, the second provisional current location as the conclusive current location irrespective of the matching degree given by said heading comparator means.

7. A reckoning system according to claim 5, wherein said radio reckoning means comprises a GPS (Global Positioning System) receiver which produces the third provisional current location on the basis of radio waves transmitted from a plurality of satellites.

8. A reckoning system according to claim 5, wherein said map matching means uses, in addition to the first provisional current location, the heading measured by said heading measurement means to select roads having orientation close to said heading, to be matched with the first provisional current location.

9. A reckoning system for mounting on a vehicle travelling on a road and for detecting a current location of the vehicle, the reckoning system comprising:

a heading measurement means for measuring a first heading of the vehicle;

a distance measurement means for measuring a distance the vehicle has travelled;

a speed measurement means for measuring a first speed of the vehicle.

a storage means for storing road map information;

a self-reckoning means for determining a first provisional current location on the basis of a last-determined current location of the vehicle and measurement results of the heading measurement means and the speed measurement means;

a map matching means for matching at least the first provisional current location with mar information of an area around the first provisional current location, stored in said storage means, so as to find a second provisional current location which resides at a road and matches best with the first provisional current location;

a radio reckoning means for determining a current location of the vehicle as a third provisional current location based on radio waves received from a plurality of artificial satellites, and for measuring a second speed and a second heading of the vehicle;

a speed comparator means for comparing the first speed measured by said speed measurement means with the second speed measured by said radio reckoning means to provide a matching degree in speed;

a heading comparator means for comparing the first heading measured by said heading measurement means with the second heading measured by said radio reckoning means to provide a matching degree in heading; and a current location determination means for determining a conclusive current location such that the conclusive current location is determined based on the third provisional current location only when the matching degrees in speed and heading obtained by said speed comparator means and said heading comparator means are both higher than a predetermined level, and, otherwise, based on the second provisional current location, wherein said speed comparator means decides that the matching degree in speed is lower than the predetermined level when the following inequality is satisfied, and, otherwise, the matching degree in speed is higher than the predetermined level $$\gamma/S1 < |S2-S1|/S1$$

where "S1" and "S2" indicate said first and second speeds, respectively, and "$\gamma$" indicates a positive weight coefficient, and wherein said heading comparator means decides that the matching degree in heading is lower than the predetermined level when the following inequality is satisfied, and, otherwise, the matching degree in heading is higher than the predetermined level $$\eta/S1 < |D2-D1|/D1$$

where "D1" and "D2" indicate said first and second headings, respectively, and "$\eta$" indicates a positive weight coefficient.

10. A reckoning system according to claim 9, wherein said current location determination means calculates a distance between the second and third provisional current locations and selects, when the distance calculated is less than a predetermined value, the second provisional current location as the conclusive current location irrespective of the matching degrees given by said speed comparator means and said heading comparator means.

11. A reckoning system according to claim 9, wherein said radio reckoning means comprises a GPS (Global Positioning System) receiver which produces the third provisional current location on the basis of radio waves transmitted from a plurality of satellites.

12. A reckoning system according to claim 9, wherein said map matching means uses, in addition to the first provisional current location, the heading measured by said heading measurement means to select roads having orientation close to said heading, to be matched with the first provisional current location.

* * * * *

Disclaimer 5,740,049—Yasutoshi Kaise, Zama, Japan. RECKONING SYSTEM USING SELF RECKONING COMBINED WITH RADIO RECKONING. Patent dated April 14, 1998. Disclaimer filed on June 7, 2002, by the Assignee, Xanavi Informatics Corporation.

*(Official Gazette, July 22, 2003)*

Disclaimer 5,740,049—Yasutoshi Kaise, Zama, Japan. RECKONING SYSTEM USING SELF RECKONING COMBINED WITH RADIO RECKONING. Patent dated April 14, 1998. Disclaimer filed on June 7, 2002, by the assignee, Xanavi Informatics Corporation.

Hereby enters this disclaimer to claims 5 and 9, of said patent.

*(Official Gazette, August 19, 2003)*